(12) United States Patent
Fukuda et al.

(10) Patent No.: US 10,109,389 B2
(45) Date of Patent: Oct. 23, 2018

(54) RECTANGULAR INSULATED WIRE, COIL AND ELECTRICAL AND ELECTRONIC DEVICE

(71) Applicants: Furukawa Electric Co., Ltd., Tokyo (JP); Furukawa Magnet Wire Co., Ltd., Tokyo (JP)

(72) Inventors: Hideo Fukuda, Tokyo (JP); Tsuneo Aoi, Tokyo (JP); Dai Fujiwara, Tokyo (JP)

(73) Assignees: FURUKAWA ELECTRIC CO., LTD., Tokyo (JP); FURUKAWA MAGNET WIRE CO., LTD., Tokyo (JP)

( * ) Notice: Subject to any disclaimer, the term of this patent is extended or adjusted under 35 U.S.C. 154(b) by 0 days.

(21) Appl. No.: 15/246,665

(22) Filed: Aug. 25, 2016

(65) Prior Publication Data

US 2016/0365164 A1    Dec. 15, 2016

Related U.S. Application Data

(63) Continuation of application No. PCT/JP2015/056681, filed on Mar. 6, 2015.

(30) Foreign Application Priority Data

Mar. 12, 2014    (JP) ................................ 2014-048647

(51) Int. Cl.
*H01B 7/00*    (2006.01)
*H01B 3/30*    (2006.01)
(Continued)

(52) U.S. Cl.
CPC ............ *H01B 3/308* (2013.01); *H01B 3/305* (2013.01); *H01B 3/306* (2013.01); *H01B 3/42* (2013.01);
(Continued)

(58) Field of Classification Search
USPC ............ 174/110 R, 110 SR, 120 R, 120 SR, 174/110 P–110 PM
See application file for complete search history.

(56) References Cited

U.S. PATENT DOCUMENTS 3,980,601 A * 9/1976 Marx ........................ C08J 3/05
428/375
4,233,435 A * 11/1980 Boldebuck ............. C08G 73/16
525/928
(Continued)

FOREIGN PATENT DOCUMENTS

CN    1078569 A    11/1993
CN    102161863 A    8/2011
(Continued)

OTHER PUBLICATIONS

Office Action from Corresponding Chinese Application No. CN 201580007036.5; dated Mar. 1, 2017.
(Continued)

*Primary Examiner* — William H Mayo, III
(74) *Attorney, Agent, or Firm* — Pearne & Gordon LLP (57) ABSTRACT

A rectangular insulated wire includes a rectangular conductor having a generally rectangular cross section and a plurality of baked-coating resin layers disposed to cover the rectangular conductor. Each of the plurality of baked-coating resin layers is formed of at least one resin selected from a group comprising a polyester-based resin including a trihydric or tetrahydric alcohol constituent, a polyester imide resin, a polyamide-imide resin and a polyimide resin. An adhesion strength between the plurality of baked-coating resin layers is greater than or equal to 5 g/mm and less than or equal to 10 g/mm.

13 Claims, 2 Drawing Sheets

(51) Int. Cl.
  *H01F 5/06* (2006.01)
  *H01B 3/42* (2006.01)
  *H02K 3/30* (2006.01)
  *H02K 3/32* (2006.01)
  *H02K 3/34* (2006.01)

(52) U.S. Cl.
  CPC ............... *H01F 5/06* (2013.01); *H02K 3/30* (2013.01); *H02K 3/32* (2013.01); *H02K 3/34* (2013.01)

(56) References Cited

U.S. PATENT DOCUMENTS

| | | | | |
|---|---|---|---|---|
| 4,461,786 A * | 7/1984 | Pauze | ............... | H01B 3/308 427/120 |
| 4,614,782 A * | 9/1986 | Nishizawa | ............... | C08G 18/2855 525/424 |
| 4,760,296 A * | 7/1988 | Johnston | ............... | C08K 3/36 174/127 |
| 4,935,302 A * | 6/1990 | Hjortsberg | ............... | C08K 3/22 174/110 N |
| 5,061,554 A * | 10/1991 | Hjortsberg | ............... | C08K 3/22 174/110 N |
| 5,337,941 A * | 8/1994 | Higashiura | ............... | H01F 41/12 219/68 |
| 5,356,708 A | 10/1994 | Matsuura et al. | | |
| 5,470,657 A * | 11/1995 | Hayami | ............... | H01B 3/441 174/110 PM |
| 5,861,578 A * | 1/1999 | Hake | ............... | H01B 3/421 174/120 R |
| 6,060,162 A * | 5/2000 | Yin | ............... | H02K 3/30 174/110 A |
| 6,087,591 A * | 7/2000 | Nguyen | ............... | C08L 67/02 174/110 R |
| 6,194,665 B1 * | 2/2001 | Kuribayashi | ............... | B32B 3/28 174/120 R |
| 6,316,046 B1 * | 11/2001 | Liener | ............... | C09D 179/08 427/117 |
| 2002/0062983 A1 | 5/2002 | Mesaki | | |
| 2003/0031868 A1 * | 2/2003 | Shue | ............... | H01F 5/06 428/375 |
| 2010/0147551 A1 | 6/2010 | Mesaki | | |
| 2011/0198109 A1 | 8/2011 | Nabeshima et al. | | |
| 2012/0247807 A1 | 10/2012 | Hanawa et al. | | |
| 2013/0240244 A1 | 9/2013 | Honda et al. | | |
| 2014/0020929 A1 * | 1/2014 | Hisada | ............... | H01B 7/0225 174/110 SR |
| 2015/0221412 A1 | 8/2015 | Caudill et al. | | |

FOREIGN PATENT DOCUMENTS

| | | | | |
|---|---|---|---|---|
| CN | 203150204 U | 8/2013 | | |
| CN | 103578618 A | 2/2014 | | |
| EP | 1 195 774 A1 | 4/2002 | | |
| JP | 2005-203334 A | 7/2005 | | |
| JP | 2007-149562 A | 6/2007 | | |
| JP | 2012-204270 A | 10/2012 | | |
| JP | 2005-203334 A * | 12/2012 | ............ | H01B 13/00 |
| JP | 2012-243614 A * | 12/2012 | ............ | H01B 7/02 |
| JP | 2013-191356 A | 9/2013 | | |
| JP | 2014-022290 A | 2/2014 | | |
| WO | 2015/120044 A2 | 8/2015 | | |

OTHER PUBLICATIONS

International Search Report from Corresponding Application No. PCT/JP2015/056681; dated Jun. 9, 2015.
English Translation of Written Opinion from Corresponding Application No. PCT/JP2015/056681; dated Jun. 9, 2015.
International Preliminary Report on Patentability from Corresponding Application No. PCT/JP2015/056681; dated Sep. 13, 2016.
Extended European Search Report dated Sep. 19, 2017 for corresponding European Application No. 15762321.6.
Chinese Office Action dated Oct. 31, 2017 in the corresponding Chinese Application No. 201580007036.5.
Notification for Granting dated May 4, 2018 in the corresponding Chinese Application No. 201580007036.5 and English translation.
Japanese Office Action dated Jun. 4, 2018 in the corresponding Japanese Application No. 2016-507497 and English translation.
Decision to Grant a Patent dated Jul. 9, 2018 in the corresponding Japanese Application No. 2016-507497 and English translation.

* cited by examiner

RECTANGULAR INSULATED WIRE, COIL AND ELECTRICAL AND ELECTRONIC DEVICE

CROSS REFERENCE TO RELATED APPLICATIONS

This is a continuation application of International Patent Application No. PCT/JP2015/056681 filed Mar. 6, 2015, which claims the benefit of Japanese Patent Application No. 2014-048647, filed Mar. 12, 2014, the full contents of all of which are hereby incorporated by reference in their entirety.

BACKGROUND

Technical Field

The present disclosure relates to a rectangular insulated wire obtained by covering a metal conductor with a resin, and particularly relates to an insulated wire used as a coil of an electric generator installed in, for example, electric power-driven vehicles.

Background Art

Conventionally, a round wire or a rectangular wire is employed as an insulated wire (magnet wire) used for a stator of an electric generator (motor generator) installed in automobiles. By employing a rectangular wire, a fill factor of the stator can be increased as compared to a case where a conductor having a generally round cross section is employed, and thus an electric generator having a reduced size and a higher power can be obtained. Recently, along with electric generators having a reduced size and higher power as described above, an insulated wire of the electric generator for vehicles is required to have properties, such as an insulating property, resistance to thermal softening, flexibility, and a long-term heat resistance, which are improved as compared to those of a conventional configuration.

In view of improving an insulating property, a so-called enameled wire having a rectangular conductor and an insulating layer of a thermosetting resin such as polyamide-imide (PAI) formed thereon is often used as a stator coil. However, an enamel coating alone does not provide sufficient reliability to high voltage. Accordingly, in order to improve the reliability to high voltage, attempts have been made to form another insulating layer on an outside of the enameled wire.

For example, an insulated wire exists which includes, on an outside of the enamel wire, another resin layer formed of a resin such as polyimide (PI) that has a higher tensile elongation as compared to PAI (see Japanese Laid-Open Patent Publication No. 2007-149562). With such an insulated wire, it is possible to suppress an occurrence of cracks in an insulation coating due to deformation upon forming an electric coil.

Further, an insulated wire exists which includes an adhesion layer formed on an electric conductor and composed of PAI or the like and a partial discharge resistance layer formed outwardly of the adhesive layer, wherein a rate of decrease of an adhesion strength between the adhesion layer and the conductor while being elongated with respect to an adhesion strength between the adhesion layer and the conductor without elongation is less than 25% (see Japanese Laid-Open Patent Publication No. 2012-204270). With this insulated wire, an occurrence of loose coating is suppressed by reducing a decrease in an adhesion strength between the conductor and the adhesion layer, and the lowering of a partial discharge resistance can be prevented.

As a rectangular insulated wire, an insulated wire exists which includes an insulation coating that covers an outer periphery of a rectangular conductor, and the insulation coating is composed of a polyimide (PI) resin and has an elongation at break of greater than 80% (see Japanese Laid-Open Patent Publication No. 2013-191356). With this insulated wire, since the PI resin layer stretches during a bend process, occurrence of damages such as cracks in the insulation coating can be suppressed.

Further, as another rectangular insulated wire, an insulated wire exists which includes a first layer composed of PAI containing an adhesion improver, a second layer composed of PAI obtained by reaction between an isocyanate component containing 2,4'-diphenylmethane diisocyanate and dimer acid diisocyanate by a total of 10 to 70 mol % and an acid component, and a third layer composed of PI, in this order (see Japanese Laid-Open Patent Publication No. 2014-22290). With such rectangular insulated wire, an adhesion strength between the conductor and the insulation coating is 43 to 64 g/mm, and it is possible to have an improved resistance to work, and also to achieve an improved heat resistance and thermal degradation.

However, the aforementioned conventional techniques may require a severe bending process on an insulated wire, and thus, even if an insulating layer includes an upper layer having increased extensibility, there is a concern that when a minute crack occurs in the upper layer, the crack may progress and reach an outer surface of a conductor. Alternatively, even if an insulating layer is made to have an increased adhesion between an upper layer and a lower layer thereof, since an adhesion strength between the two layers is unnecessarily high, a crack from the insulating layer and reaching an external surface of the conductor may be produced when an insulated wire is bent. Therefore, none of the aforementioned techniques are sufficient in flex resistance reliability. Further, recently, vehicle power generators that generate a high voltage are rapidly spreading, and insulated wires used for such a purpose require a high partial discharge inception voltage (PDIV). However, with the aforementioned conventional techniques, the partial discharge inception voltage is not sufficient.

It is an object of the present disclosure to provide a rectangular insulated wire having improved flex resistance reliability by preventing the generation of a crack reaching the conductor while maintaining flexibility and resistance to thermal softening, and further achieves a high insulation property by having a high partial discharge inception voltage, as well as a coil and an electrical and electronic device.

The present inventors carried out assiduous studies to attain the above object, and as a result, reached the findings that, by forming a plurality of baked-coating resin layers on a conductor, the plurality of baked-coating resin layers being formed of two or more materials, and further by specifying the range of relative permittivity of at least one of the aforementioned plurality of baked-coating resin layers, flex resistance reliability can be improved since a crack reaching the conductor is prevented, and further, a high partial discharge inception voltage can be achieved, while maintaining conventional properties. The present disclosure was contrived based on the above-mentioned findings.

According to a first aspect of the present disclosure, a rectangular insulated wire includes: a rectangular conductor having a generally rectangular cross section; and a plurality of baked-coating resin layers disposed to cover the rectangular conductor, each of the plurality of baked-coating resin layers being formed of at least one resin selected from a group comprising a polyester-based resin including a trihydric or tetrahydric alcohol constituent, a polyester imide resin, a polyamide-imide resin and a polyimide resin, an adhesion strength between the plurality of baked-coating resin layers being greater than or equal to 5 g/mm and less than or equal to 10 g/mm.

According to a second aspect of the present disclosure, a coil is provided wherein the aforementioned rectangular insulated wire is wound.

According to a third aspect of the present disclosure, an electric or electronic device includes the aforementioned coil.

According to the rectangular insulated wire of the present disclosure, each of a plurality of baked-coating resin layers is formed of at least one resin selected from a group comprising a polyester-based resin including a trihydric or tetrahydric alcohol constituent, a polyester imide resin, a polyamide-imide resin and a polyimide resin. According to such a configuration, flex resistance reliability can be improved by preventing the generation of a crack reaching the conductor while maintaining flexibility and resistance to thermal softening, and further a high insulation property can be achieved by having a high partial discharge inception voltage.

Particularly, since each of the plurality of baked-coating resin layers is formed of at least one resin selected from a group comprising a polyester-based resin including a trihydric or tetrahydric alcohol constituent, a polyester imide resin, a polyamide-imide resin and a polyimide resin, even if a crack occurs in an outer baked-coating resin layer of the at least one baked-coating resin layers in a severe bending process, it is possible to prevent an occurrence of a crack in an inner baked-coating resin layer by causing a peel to occur between the two baked-coating resin layers that are adhered with an adhesion strength between coating layers of greater than or equal to 10 g/mm and less than or equal to 5 g/mm. Therefore, generation of a crack reaching the conductor can be positively prevented. The measurement of adhesion strength was carried out by making two parallel slits in a rectangular insulated wire along a longitudinal direction thereof and extending over a length of ⅓ to ½ of the long side and measuring a force applied when peeling between the slits, and the measured value was converted into a numerical value per 1 mm to obtain an adhesion strength.

Also, since an inner most layer among the plurality of baked-coating resin layers has a thickness of greater than or equal to 20 μm and less than or equal to 60 μm, a higher dielectric breakdown voltage can be obtained.

Also, since a content of trihydric or tetrahydric alcohol constituents is 30 to 90 mol % to a total number of moles of alcohol constituents in the polyester-based resin, adhesion with the conductor can be improved without affecting electrical characteristics, and occurrence of a crack reaching the conductor can be positively prevented.

Further, since the rectangular insulated wire further includes an extruded covering layer disposed over an outermost layer of the plurality of baked-coating resin layer, the extruded covering layer being formed of a thermoplastic resin, flex resistance reliability can be improved while maintaining flexibility and resistance to thermal softening, and in addition, a higher partial discharge inception voltage can be achieved.

Also, with the rectangular insulated wire of the present disclosure being wound into a coil, even in a case where a high voltage is applied, a partial discharge generation can be suppressed, and a rectangular insulated wire that can significantly suppress an occurrence of dielectric breakdown can be obtained. Particularly, a further significant effect can be obtained by applying the rectangular insulated wire of the present disclosure to an electrical and electronic devices such as motor-generators.

BRIEF DESCRIPTION OF DRAWINGS

FIGS. 1A and 1B are diagrams schematically showing a configuration of a rectangular insulated wire according to an embodiment of the present disclosure, of which

DETAILED DESCRIPTION

Figure 1A:
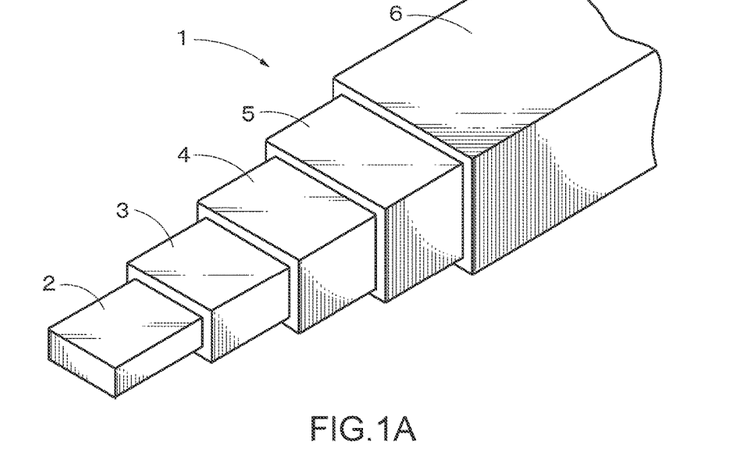
FIG. 1A is a perspective diagram and FIG. 1B is a partial cross-sectional view.
Figure 1B:
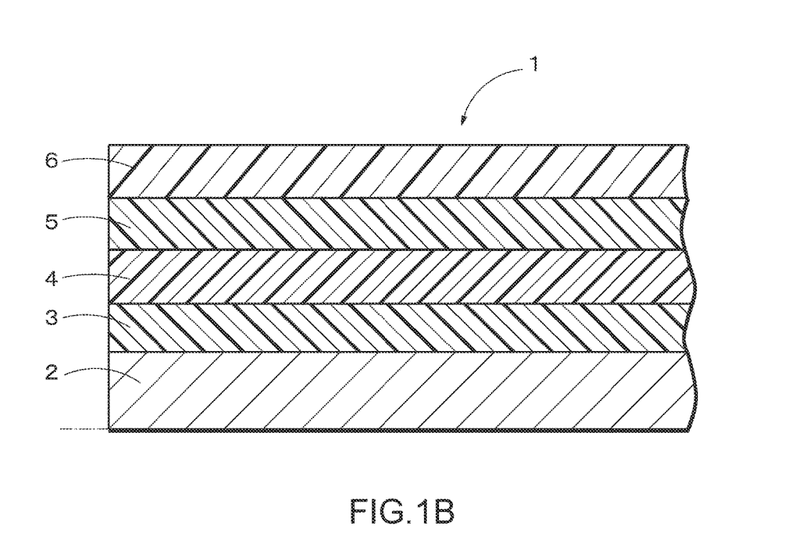

Further features of the present disclosure will become apparent from the following detailed description of exemplary embodiments with reference to the accompanying drawings. FIGS. 1A and 1B are diagrams schematically showing a configuration of a rectangular insulated wire according to an embodiment of the present disclosure, of which FIG. 1A is a perspective diagram and FIG. 1B is a partial cross-sectional view. Length, width and thickness of each configuration in FIGS. 1A and 1B are shown by way of example, and length, width and thickness of each configuration in the rectangular insulated wire of the present disclosure should not be limited to those illustrated in FIGS. 1A and 1B.

Referring to FIGS. 1A and 1B, a rectangular insulated wire 1 includes a rectangular conductor 2 having a generally rectangular cross section, a plurality of baked-coating resin layers 3, 4, 5 which are formed on the rectangular conductor, and an extruded covering layer 6 that is formed to cover the baked-coating resin layer 5, which is an outer most layer among the plurality of baked-coating resin layers. In this manner, according to the present disclosure, the plurality of baked-coating resin layers include a plurality of baked-coating resin layers that are composed of mutually different materials and formed adjacent to each other. Further, among the plurality of baked-coating resin layers 3, 4, 5, at least one layer has a relative permittivity of less than 3.8. In this rectangular insulated wire 1, a sum of thicknesses of the plurality of baked-coating resin layers 3, 4, 5 and a thickness of the extruded covering layer 6, in other words, a total thickness of the insulating layers, is 60 μm to 285 μm.

(Rectangular Conductor)

The size of the rectangular conductor 2 is determined depending on application, and thus not particularly specified, but it is preferable that the rectangular conductor 2 has, in its cross section, a ratio of a short side to a long side (short side:long side) of 1:1 to 1:4. For example, the long side preferably has a length of 1.0 mm to 5.0 mm, and more preferably 1.4 mm to 4.0 mm. The short side preferably has a length of 0.4 mm to 3.0 mm, and more preferably, 0.5 mm to 2.5 mm. However, the range of conductor size with which an effect of the present disclosure can be obtained is not limited thereto. In a case of a rectangular conductor, although it may also depend on the application, an oblong cross section is more common as compared to a square cross section. Further, such rectangular conductor 2 may be chamfered at four corners of a cross section of the conductor (radius of curvature r), and a smaller "r" is preferable for the purpose of increasing the fill ratio of the conductor in a stator slot, and a greater "r" is preferable for the purpose of suppressing partial discharge phenomenon due to electric field convergence at the four corners. Accordingly, the radius of curvature r is preferably 0.6 mm or less, and more preferably 0.2 mm to 0.4 mm. However, the range within which an effect of the present disclosure can be achieved is not limited thereto.

The rectangular conductor 2 is made of a metal having conductivity, and a material thereof may be any material having conductivity, and may be made of, for example, aluminum or an aluminum alloy, or copper or a copper alloy. In a case where the rectangular conductor 2 is made of an aluminum alloy, the material may be a 1000 series alloy having a low strength but a high aluminum ratio or an Al—Mg—Si based alloy such as, for example, a 6101 alloy, which is a 6000 series aluminum alloy. Although aluminum or an aluminum alloy has a conductivity of about two-thirds of the conductivity of copper or a copper alloy, its specific gravity is about one-third thereof. Thus, a coil can be light weighted and can contribute to the light weighting of the vehicle and improvement in fuel consumption.

In a case where the rectangular conductor 2 is formed of copper or a copper alloy, those used in conventional insulated wires may be used. However, preferably, those formed of low oxygen copper with an oxygen content of less than or equal to 30 ppm, and further preferably low oxygen copper with an oxygen content of less than or equal to 20 ppm or oxygen-free copper are used. With the oxygen content of less than or equal to 30 ppm, even if the conductor is caused to melt by heat for welding, voids due to contained oxygen do not occur at a welded portion and thus a decrease in electric resistance at the welded portion can be prevented, and strength at the welded portion can be maintained.

(Baked-Coating Resin Layer)

The baked-coating resin layers 3, 4, 5 is a layered body having a total thickness of greater than or equal to 60 μm, and preferably 60 μm to 100 μm, with each layer having a thickness of 20 μm to 60 μm. Each of the baked-coating resin layers is an enamel layer formed by baking a resin varnish applied to the rectangular conductor 2 or to another baked-coating resin layer. According to the present disclosure, a plurality of such enamel layers are provided with constituents of the resins forming adjacent two layers being different from each other, and additives, which are secondary constituents, being also different.

In the present disclosure, regarding the baked-coating resin layers 3, 4, 5, the thickness of an innermost layer (a lower layer) among a plurality of baked-coating resin layers formed adjacent to each other has a thickness of greater than or equal to 20 μm. For example, in a case where the baked-coating resin layers 3, 4 formed adjacent to each other are formed of resins that are different from each other, the baked-coating resin layer 3 constituting an innermost layer has a thickness of greater than or equal to 20 μm. In a case where the baked-coating resin layers 4, 5 is formed of resins that are different from each other, the baked-coating resin layer 4 constituting an innermost layer has a thickness of 20 μm. Accordingly, since the innermost layer has a thickness of greater than or equal to 20 μm, an adhesion strength at an interface between the outer layers and the innermost layer is less than or equal to 10 g/mm, and even if a crack has occurred in the outer layers due to the bending process, a peeling will occur at the interface and prevents a crack from occurring in an inner layer, and, as a result, an insulation property of a thickness of 20 μm of at least the inner layer can be ensured. A high dielectric breakdown voltage after the bending process can be achieved.

Also, it is preferable that an innermost layer (a lower layer) among the plurality of baked-coating resin layers that are formed adjacent to each other has a thickness of greater than or equal to 20 μm and less than or equal to 60 μm. With the innermost layer having a thickness exceeding 60 μm, there is a concern that an adhesion strength with the conductor may extremely decrease.

Also, with the present disclosure, among the baked-coating resin layers 3, 4, 5, a relative permittivity of at least one of the baked-coating resin layers is less than 3.8. By lowering the relative permittivity, a high partial discharge inception voltage can be obtained.

Particularly, it is preferable that each of the aforementioned plurality of baked-coating resin layers that are formed adjacent to each other are formed of at least one resin selected from a group comprising a polyester-based resin including a trihydric or higher alcohol constituent, a polyester imide resin, a polyamide-imide resin and a polyimide resin. Also, it is preferable that an adhesion strength between two baked-coating resin layers formed of two resins, respectively, selected from the aforementioned group is greater than or equal to 5 g/mm to 10 g/mm. When the adhesion strength is less than 5 g/mm, a peeling between the resin layers may easily occur with a small stress other than the bending process. Also, with the adhesion strength being less than or equal to 10 g/mm, when a bending stress is applied to the two baked-coating resin layers, a stress concentration occurs at an interface between these two layers, and a crack occurs at the interface. As a result, a crack is less likely to occur in a lower layer even if a crack that progresses towards a conductor has occurred in an upper layer among the plurality of baked-coating resin layers, since, after the aforementioned crack has reached an interface between the plurality of baked-coating resin layers, the crack progresses along the interface. Therefore, with the presence of an interface between the layers of the plurality of baked-coating resin layers, occurrence of a crack that progresses to the conductor can be prevented.

<Polyester-Based Resin Including Trihydric or Higher Alcohol Constituent>

A polyester-based resin used in the present disclosure is a resin having ester linkages in a molecule, and includes trihydric or higher alcohol constituents as alcohol constituents forming said ester linkages.

A trihydric or higher alcohol constituent is an alcohol having three or more hydroxyl groups. With the number of hydroxyl groups being three or more, adhesion with the conductor can be improved without decreasing electric properties, because of an increased number of end groups per molecule of the polyester-based resin. An adhesion strength in this case is approximately 50 g/mm.

The aforementioned alcohol may be any of aliphatic alcohols, aromatic alcohols or the like. Considering the points such as flexibility of a polyester-based resin layer, aliphatic alcohols are preferable. An aliphatic group and an aromatic group from which hydroxyl groups are removed may include a hydrocarbon group comprising carbon and hydrogen, and may include a group having a hetero atom, e.g., a heterocycle group.

Aliphatic alcohols are preferably those having a hydroxyethyl or hydroxymethyl part as a partial structure, and, for example, those having at least two such partial structures or three such partial structures. Specifically, these may be, for example, trihydroxyethylisocyanurate (also referred to as tris(2-hydroxyethyl)isocyanurate), glycerin, trimethylolpropane, pentaerythritol, dipentaerythritol, hexanetriol, sorbitol, or the like. Particularly, trihydroxyethylisocyanurate, glycerin, and trimethylolpropane are preferable.

Aromatic alcohols may include, for example, trihydroxy benzyl alcohol.

In a case where the polyester-based resin contains alcohol constituents other than trihydric or higher alcohol constituents (in the present disclosure, referred to as dihydric alcohol constituents), the dihydric alcohol constituents are not particularly limited as long as they are derived from dihydric alcohols. These may be, for example, aliphatic diols or aromatic diols. Note that the aliphatic groups and the aromatic groups are as described above.

Such dihydric alcohol constituents may be, for example, those derived from various alcohols of alkylene glycol such as ethyleneglycol, diethyleneglycol, propyleneglycol, dipropyleneglycol, neopentylglycol, 1,3-butanediol, and 1,4-butanediol. Considering the flexibility, alkyleneglycol is preferable, and ethyleneglycol is more preferable.

In the present disclosure, trihydric or higher alcohol constituents may be used together with dihydric alcohol constituents. Also, in the present disclosure, alcohol constituents may include those derived from monohydric alcohol, as long as it does not an impair the object of the invention.

In such a polyester-based resin, it is preferable that a content of trihydric or higher alcohol constituent is 30 to 90 mol % with respect to a total number of moles of alcohol constituents constituting the polyester-based resin. Particularly, it is preferable that a content of trihydric or tetrahydric alcohol constituent is 30 to 90 mol % with respect to a total number of moles of alcohol constituents constituting the polyester-based resin. When the content is within the aforementioned ranges, adhesion with the conductor improves without affecting electrical characteristics, and, in addition, an effect of preventing occurrence of a crack reaching a conductor increases. The aforementioned content is further preferably 40 to 80 mol %, since electrical characteristics, adhesion with the conductor, and an effect of preventing occurrence of a crack reaching a conductor will be also achieved at an even higher level.

Here, the aforementioned content can be calculated from a content (mol) of all alcohol constituents of the polyester-based resin and a content (mol) of the trihydric or higher alcohol constituents. This content may be, for example, measured by performing a component analysis by thermal decomposition or chemical decomposition or a structure analysis by NMR.

Among the constituents constructing the polyester-based resin, those other than the alcohol constituents are appropriately selected based on the type of resin. For example, for a polyester resin, those may include a carboxylic acid constituent derived from dihydric or higher carboxylic acids (including anhydrides and esters).

Such carboxylic acids may be aliphatic carboxylic acids and aromatic carboxylic acids, of which aromatic carboxylic acids are preferable. The number of hydroxyl groups in a carboxylic acid is not particularly limited as long as it is two or more, but the number of hydroxyl groups is preferably two, and further preferably, two only.

A carboxylic acid that can be used for the present disclosure is not particularly limited as long as it is a commonly used polyester resin, and includes, for example, a terephthalic acid, an isophthalic acid, a naphthalenedicarboxylic acid, a trimellitic acid, a 1,3,5-benzene tricarboxylic acid, pyro mellitic acid, and a 1,2,4,5-cyclohexane tetracarboxylic acid. Among the above, a terephthalic acid (including anhydrides, esters or the like) is preferable, and a terephthalic acid alkyl esters are more preferable, and a terephthalic acid alkyl (carbon number 1 to 3) esters are further preferable.

Further, a polyester-based resin may be a resin comprising modified polyester polymers including a trihydric or higher alcohol constituent in some or all of the alcohol constituent, and may be a blend resin of resins comprising modified polyester polymers including trihydric or higher alcohol constituents and other resins.

<Polyesterimide>

Polyesterimide used in the present disclosure may be those indicated by the following general formula (1).

[Chemical Formula 1]

In the above formula, $R^1$ represents a trihydric organic group such as a residue of tricarboxylic acid anhydride, $R^2$ represents a dihydric organic group such as a residue of diol, and $R^3$ represents a dihydric organic group such as a residue of diamine.

Polyesterimide is obtained by reacting tricarboxylic acid anhydride, diol and diamine with a known method. Tricarboxylic acid anhydride may include trimellitic anhydride, 3,4,4'-benzophenone tricarboxylic acid anhydride, 3,4,4'-biphenyl tricarboxylic acid anhydride, and trimellitic anhydride is preferable.

Diol is preferably ethylene glycol, propylene glycol, trimethylene glycol, diethylene glycol or the like.

Diamine is preferably 4,4'-diaminodiphenylmethane, 4,4'-diaminodiphenylether, m-phenylenediamine, p-phenylenediamine, 1,4-diaminonaphthalene, hexamethylenediamine, diaminodiphenylsulphone or the like.

<Polyamide-Imide>

The polyamide-imide used in the present disclosure is obtained by reacting tricarboxylic acid or derivatives thereof and diisocyanate and/or diamine in an organic solvent. To this polyamide-imide, an adhesion improver to improve adhesion with a quantity of detectable lower limit or more is not added.

Tricarboxylic acids or derivatives thereof include trimellitic acid anhydrides, trimellitic acid anhydride monochlorides or the like. Diisocyanates include aliphaticdiisocyanates such as trimethylenediisocyanate, tetramethylenediisocyanate, and trimethylhexamethylenediisocyanate, aromaticdiisocyanates such as 4,4'-diphenylmethanediisocyanate, 4,4'-diphenyletherdiisocyanate, 2,4- or 2,6-tolylenediisocyanate, m- or p-xylenediisocyanate, and derivatives in which such diisocyanates are blocked with phenols. Diamines may be aliphatic diamine such as ethylenediamine and hexamethylenediamine, aromatic diamine such as m-phenylenediamine, p-phenylenediamine, 2,4-diaminotoluene, 4,4'-diamino-3,3'-dimethyl-1,1'-biphenyl, 4,4'-diamino-3,3'-dihydroxy-1,1'-biphenyl, 3,4'-diaminodiphenyl ether, 4,4'-diaminodiphenylether, 3,3'-diaminodiphenylsulphone, 4,4'-diaminodiphenylsulphone, 4,4'-diaminodiphenylsulfide, 2,2-bis(4-aminophenyl)propane, 2,2-bis(4-aminophenyl)hexafluoropropane, 1,3-bis(4-aminophenoxy)benzene, 1,4-bis(4-aminophenoxy)benzene, 4,4'-bis(4-aminophenoxy)biphenyl, 2,2-bis[4-(4-aminophenoxy)phenyl]propane, 2,2-bis[4-(4-aminophenoxy)phenyl]hexafluoropropane, bis[4-(3-aminophenoxy)phenyl] sulfone, bis[4-(4-aminophenoxy)phenyl]sulfone, as well as, 2,6-diaminopyridine, 2,6-diamino-4-methylpyridine, 4,4'-(9-fluorenylidene)dianiline, α,α-bis(4-aminophenyl)-1,3-diisopropylbenzene.

Reaction solvents may be aprotic polar solvents such as 2-pyrrolidone, N-methyl-2-pyrrolidone, and N,N-dimethylacetamide, and phenol solvents such as phenol, cresol, and xylenol.

An adhesion improver may be, for example, thiadiazole, thiazole, mercaptobenzimidazole, thiophenol, thiophon, thiol, tetrazole, benzimidazole, butylated melamine, and heterocyclic mercaptan.

The aforementioned polyamide-imide has a glass transition point (Tg) of preferably 250 to 300° C., and more preferably 255 to 270° C.

Also, another polyamide-imide may include polyamide-imide (high flexibility polyamide-imide) which is obtained by reacting an isocyanate component and an acid component, the isocyanate component including 2,4'-diphenylmethanediisocyanate and dimer acid diisocyanate.

For the high flexibility polyamide-imide resin varnish, 2,4'-diphenylmethanediisocyanate (2, 4'-MDI) and dimer acid diisocyanate are used as an isocyanate component. By using those isocyanate components, a layer having an improved flexibility is formed, and an improved resistance to work can be given to an insulated wire. A total of 2, 4'-MDI and a dimer acid diisocyanate is preferably 10 to 70 mol % of the isocyanate component, and more preferably 30 to 60 mol %.

Another isocyanate component to be used together may be 4,4'-diphenylmethanediisocyanate (4,4'-MDI), 3,4'-diphenylmethanediisocyanate, 3,3'-diphenylmethanediisocyanate, 2,3'-diphenylmethanediisocyanate, 2,2'-diphenylmethanediisocyanate, as well as, tolylenediisocyanate (TDI), diphenyletherdiisocyanate, naphthalenediisocyanate, phenylenediisocyanate, xylylenediisocyanate, diphenylsulphondiisocyanate, bitolylenediisocyanate, diaminediisocyanate, and isomers thereof. Further, aliphatic diisocyanates such as hexamethylenediisocyanate, isophoronediisocyanate, methylenedicyclohexyldiisocyanate, xylylenediisocyanate, and cyclohexanediisocyanate, multifunctional isocyanate such as triphenylmethane triisocyanate, multimers such as polymericisocyanate or tolylenediisocyanate may be used together.

Further, acid components may include aromatic tetracarboxylic dianhydrides such as trimellitic acid anhydride (TMA), pyromelletic dianhydride (PMDA), benzophenone tetracarboxylic acid dianhydride (BTDA), biphenyl tetracarboxylic acid dianhydride, diphenylsulphon tetracarboxylic acid dianhydride (DSDA), oxydiphthalic dianhydride and isomers thereof, alicyclic tetracarboxylic acid dianhydrides such as butane tetracarboxylic acid dianhydride and 5-(2,5-dioxotetrahydro-3-furanyl)-3-methyl-3-cyclohexene-1,2-dicarboxylic anhydride, and tricarboxylic acid such as trimesic acid and tris(2-carboxyethyl) isocyanurate (CIC acid) and isomers thereof. Among these, trimellitic anhydride (TMA), which is inexpensive and safer, is preferable.

Further, other than the aforementioned isocyanate component and the acid component, polycarboxylic acid may be added. Polycarboxylic acid may be aromatic dicarboxylic acids such as terephthalic acid and isophthalic acid, aromatic tricarboxylic acid such as trimellitic acid and hemimellitic acid, and aliphatic polycarboxylic acid such as dimer acid.

Further, solvents for reacting the aforementioned isocyanate component and the acid component includes aprotic polar solvents such as 2-pyrrolidone, N-methyl-2-pyrrolidone (NMP), and N,N-dimethylacetamide, and phenol solvents such as phenol, cresol, and xylenol.

When reacting the isocyanate component and the acid component, catalysts such as amines, imidazoles, and imidazolines may be used. Catalysts are preferably those that do not inhibit stability of the resin varnish.

The aforementioned high flexibility polyamide-imide has a glass transition point (Tg) of preferably 200 to 270° C., and more preferably 230 to 260° C.

<Polyimide>

Polyimides used in the present disclosure is not particularly limited, and may be normal polyimides including wholly aromatic polyimides and thermosetting aromatic polyimides. For example, using a polyamide acid solution which is obtained by reacting aromatic tetracarboxylic dianhydride and aromatic diamines in a polar solvent, it can be obtained by imidizing with a heat treatment that is applied when coating.

The resin varnish having the aforementioned components may be an organic solvent that is used for making a thermosetting resin into a varnish. The organic solvent is not particularly limited as long as it does not inhibit the reaction of the thermosetting resin, and, for example, the organic solvent may be: amide solvents such as N-methyl-2-pyrrolidone (NMP), N,N-dimethylacetamide (DMAC), dimethylsulfoxide, and N,N-dimethylformamide; urea solvents such as N,N-dimethylethyleneurea, N,N-dimethylpropyleneurea, and tetramethylurea; lactone solvents such as γ-butyrolactone and γ-caprolactone; carbonate solvents such as propylene carbonate; ketone solvents such as methylethylketone, methylisobutylketone, and cyclohexanone; ester solvents such as such as ethylacetate, n-butyl acetate, butyl cellosolve acetate, butyl carbitol acetate, ethyl cellosolve acetate, and ethyl carbitol acetate; glyme solvents such as diglyme, triglyme, and tetraglyme; hydrocarbon solvents such as toluene, xylene, and cyclohexane; and sulfone solvents such as sulfolane.

Among these organic solvents, amide solvents and urea solvents are preferable in terms of properties such as a high dissolving property and a high reaction accelerating property, and N-methyl-2-pyrrolidone, N,N-dimethylacetamide, N,N-dimethylethylene urea, N,N-dimethylpropylene urea, and tetramethylurea are more preferable since these do not have hydrogen atoms which are likely to inhibit crosslinking reactions by heating, and N-methyl-2-pyrrolidone is preferable.

Additives which are minor components of the resin varnish include, for example, antioxidant, antistatic agent, ultra-violet light inhibitor, light stabilizer, fluorescent whitening agent, pigment, dye, compatibilizer, lubricant, strengthening agent, flame retardant, crosslinking agent, crosslinking assistant, plasticizer, viscosity-increasing agent, viscosity-reducing agent and elastomer.

The resin varnish may be, for example, applied to a rectangular conductor using a varnish-applying die having a shape similar to the shape of the conductor, and in a case where the cross-sectional shape of the conductor is quadrangular, the resin varnish may be applied using a die having shape similar to the shape of the conductor. The conductor having the aforementioned resin varnish applied thereon is baked in a baking furnace. For example, using a free convection-type vertical furnace having a length of approximately 5 m to 8 m, the process may be performed continuously at a temperature of 400° C. to 500° C. with a passage time of 10 to 90 seconds.

(Extruded Covering Layer)

The extruded covering layer 6 is a thermoplastic resin layer which is formed on the baked-coating resin layer 5 among the baked-coating resin layers 3, 4, 5.

The extruded covering layer 6 has a thickness of 20 μm to 200 μm, and is a layer that coats the aforementioned enamel layer by extrusion. The extruded covering layer 6 lowers the partial discharge producing voltage, and considering the chemical resistance, it is preferable to be composed of a crystalline resin having a melting point of greater than or equal to 250° C. Such a resin includes, for example, polyetheretherketone (PEEK), modified polyetheretherketone (modified PEEK), polyetherketone ketone (PEKK), polyetherketone (PEK), polyphenylene sulfide (PPS) and polymer alloys based thereon, or thermoplastic polyimide (PI), of which PEEK and PPS are particularly preferable.

It is further preferable that the extruded covering layer 6 is composed of a crystalline resin having a melting point of greater than or equal to 250° C. and less than or equal to 360° C. When the melting point is greater than 360° C., there is no drawback in characteristics, but there is a concern that the specification of an extruder for melting may be limited.

The thermoplastic resin forming each thermoplastic resin layer may be used alone or two kinds may be used together. When two kinds of thermoplastic resins are mixed in use, for example, both may be made into a polymer alloy and used as a compatible uniform mixture, or a non-compatible blend may be used by forming a compatible condition using a compatibility accelerator. In the present disclosure, the above-mentioned various additives may be contained in materials for obtaining a thermoplastic resin layer, as far as they do not have an influence on characteristics.

It is preferable that the extruded coating layer 6 has a thickness of less than or equal to 200 μm, and more preferably, less than or equal to 180 μm to achieve an effect of the present disclosure. In case the thickness of the extruded coating layer is excessively large, a white colored portion may be produced at a surface of the insulated wire when the insulated wire is wound around an iron core and heated. As described above, if the extruded coating layer is excessively thick, since the extruded coating layer itself has rigidity, and thus lacks flexibility as an insulated wire, there is a possibility that a problem in maintaining an electrically insulating property before and after the processing may arise. On the other hand, in terms of preventing bad insulation, the thickness of the extruded coating layer is preferably greater than or equal to 10 μm, and more preferably, greater than or equal to 20 μm.

In a case where the extruded coating layer 6 is formed by extrusion, it does not need to be passed through a baking furnace in the fabricating process, and thus the thickness of the insulating layer can be increased without increasing the thickness of an oxide film of the conductor.

With the rectangular insulated wire 1 configured as described above, a total thickness of the baked-coating resin layers 3, 4, 5 is greater than or equal to 60 μm, and the partial discharge inception voltage in this case is greater than or equal to 800 Vp. Also, a total thickness of the baked-coating resin layers 3, 4, 5 and the extruded covering layer 6 is greater than or equal to 120 μm, and the partial discharge inception voltage in this case is greater than or equal to 1200 Vp. Thereby, even if a high voltage is produced in a circuit, a dielectric breakdown is less likely to occur in the circuit, and a higher insulation property can be obtained. When the partial discharge inception voltage is less than 800 Vp, it becomes difficult to achieve a high insulation property when a high voltage is produced in a circuit. Further, it is preferable for the partial discharge inception voltage of the rectangular insulated wire 1 to be less than or equal to 1500 Vp.

The rectangular insulated wire according to the present embodiment is described above. However, the present disclosure is not limited to embodiment described above, and various alterations and modifications are possible based on the technical idea of the present disclosure.

For example, in the embodiment described above, three layers of baked-coating resin layers are provided, but it is not limited thereto, and two layers or four layers may be provided. In a case where the baked-coating resin layer includes two layers, the two layers are formed of mutually different materials, and also formed adjacent to each other. In a case where the rectangular insulated wire has three layers or more baked-coating resin layers, these baked-coating resin layers need to include two baked-coating resin layers composed of mutually different materials and formed adjacent to each other.

Figure 2:
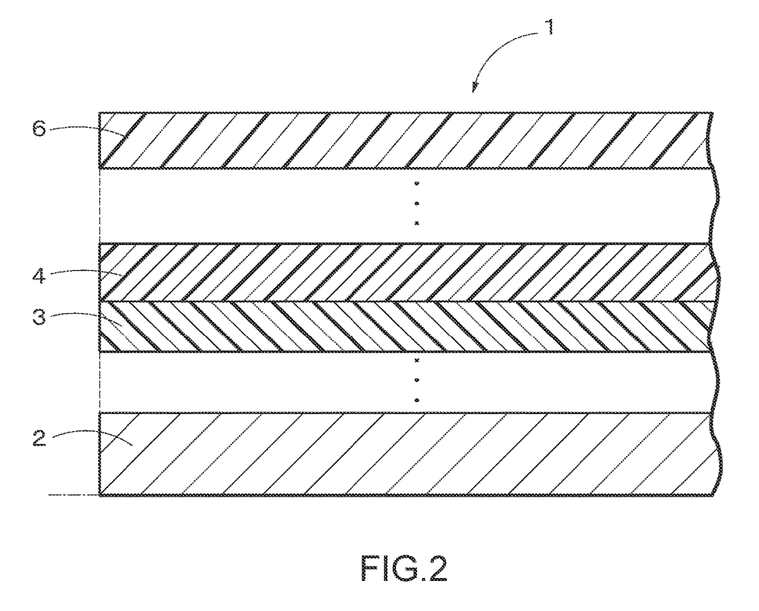
FIG. 2 is a partial cross-sectional view showing a variant of the rectangular insulated wire shown in FIGS. 1A and 1B.

In a case where the baked-coating resin layer has a two-layered structure, the baked-coating resin layers 3 and 4 may be directly formed on an outer peripheral surface of the rectangular conductor 1, or, as shown in FIG. 2, may be formed via another layer having an insulating property and not directly on the rectangular conductor 1. Also, in a case where a plurality of baked-coating resin layers are provided, the plurality of baked-coating resin layers may be formed on a rectangular conductor another layer.

Further, the extruded covering layer 6 is formed on the baked-coating resin layer 5, but it is not limited thereto, and it may be formed on the thermoplastic resin layer 4, or, as shown in FIG. 2, it may be formed with another layer having an insulation property being provided in between and not directly on the thermoplastic resin layer 4. Also, the extruded covering layer does not need to be formed on the baked-coating resin layer.

EXAMPLES

The present disclosure will be described in detail based on the following examples. The present disclosure is not limited to Examples described below.

Case in which Two Layers of Baked-Coating Resin Layers are Provided

Example 1

First, an example for two baked-coating resin layers will be described. A rectangular conductor (copper with an oxygen content of 15 ppm) having thickness 1.8×width 2.5 mm and chamfered at four corners with a radius r=0.5 mm was prepared. As a thermosetting resin, polyamide-imide resin varnish (manufactured by Hitachi Chemical Company Ltd., product name "HI-406") was used, and the resin was coated on the conductor using a die having a geometry similar to the shape of the conductor. The coated conductor was allowed to pass through a baking furnace set at 450° C. and having a furnace length of 8 m with a speed such that the baking time is 15 seconds, to thus form an enamel layer having a thickness of 5 μm by this single baking step. By repeating this step for four times, a baked-coating resin layer (A) having a thickness of 20 μm was formed.

Then, on the baked-coating resin layer (A), using a modified polyester resin varnish (product made by Totoku Toryo Co., Ltd., product name "neo-heat 8242"; THEIC, trihydric or higher alcohol constituents 70 mol %), a resin was coated on the baked-coating resin layer (A) using a die similar to the above, and, by repeating the baking step similar to the above for several times, a baked-coating resin layer (B) having a thickness of 40 µm was formed and an insulated wire having a total thickness of (A) and (B) of 60 µm was obtained.

Example 2

An insulated wire was obtained in a manner similar to Example 1, except that the baked-coating resin layer (A) was formed using polyimide (manufactured by Unitika Ltd., product name "U imide") as a resin and had a thickness of 25 µm, and that the baked-coating resin layer (B) was formed using PAI as a resin.

Example 3

An insulated wire was obtained in a manner similar to Example 1, except that the baked-coating resin layer (A) had a thickness of 30 µm and that the baked-coating resin layer (B) had a thickness of 50 µm.

Example 4

An insulated wire was obtained in a manner similar to Example 1, except that the baked-coating resin layer (A) was formed using a modified polyester (THEIC, trihydric or higher alcohol constituent 60 mol %) as a resin and had a thickness of 35 µm, and that the baked-coating resin layer (B) was formed using PAI as a resin and had a thickness of 60 µm.

Case in which Three Layers of Baked-Coating Resin Layers are Provided

Example 5

Next, an example for three baked-coating resin layers will be described. A rectangular conductor similar to the one used in Example 1 was prepared, and a PAI resin varnish was used as a thermosetting resin, and the resin was coated on the conductor using a die having a geometry similar to the shape of the conductor. The coated conductor was allowed to pass through a baking furnace set at 450° C. and having a furnace length of 8 m with a speed such that baking time is 15 seconds, to thus form an enamel layer of thickness 5 µm by this single baking step. By repeating this step for four times, a baked-coating resin layer (A) having a thickness of 20 µm was formed.

Then, on the baked-coating resin layer (A), using a modified polyester resin varnish (THEIC, trihydric or higher alcohol constituents 70 mol %), a resin was coated on the baked-coating resin layer (A) using a die similar to the above, and, by repeating the baking step similar to the above for several times, a baked-coating resin layer (B) having a thickness of 20 µm was formed.

Then, on the baked-coating resin layer (B), using a PAI resin varnish, a resin was coated on the baked-coating resin layer (B) using a die similar to the above, and, by repeating the baking step similar to the above for several times, a baked-coating resin layer (C) having a thickness of 20 µm was formed and an insulated wire was obtained which has a total thickness of (A), (B) and (C) of 60 µm.

Example 6

An insulated wire was obtained in a manner similar to Example 5, except that: the baked-coating resin layer (A) had a thickness of 25 µm; the baked-coating resin layer (B) was formed using PI as a resin and had a thickness of 25 µm; and the baked-coating resin layer (C) was formed using a modified polyester (THEIC, trihydric or higher alcohol constituent 60 mol %) as a resin and had a thickness of 30 µm.

Example 7

An insulated wire was obtained in a manner similar to Example 5, except that: the baked-coating resin layer (A) was formed using PI as a resin and had a thickness of 30 µm; the baked-coating resin layer (B) was formed using a modified polyester (THEIC, trihydric or higher alcohol constituent 60 mol %) as a resin and had a thickness of 30 µm; and the baked-coating resin layer (C) was formed using PI as a resin and had thickness of 25 µm.

Example 8

An insulated wire was obtained in a manner similar to Example 5, except that: the baked-coating resin layer (A) had a thickness of 25 µm; the baked-coating resin layer (B) was formed using a modified polyester (GRY, trihydric or higher alcohol constituent 70 mol %) as a resin and had a thickness of 30 µm; and the baked-coating resin layer (C) was formed using PAI as a resin and had a thickness of 35 µm.

Example 9

An insulated wire was obtained in a manner similar to Example 5, except that: the baked-coating resin layer (A) had a thickness of 30 µm; the baked-coating resin layer (B) was formed using a modified polyester (THO, trihydric or higher alcohol constituent 60 mol %) as a resin and had a thickness of 30 µm; and the baked-coating resin layer (C) was formed using PI as a resin and had a thickness of 40 µm.

Example 10

An insulated wire was obtained in a manner similar to Example 5, except that: the baked-coating resin layer (A) was formed using polyesterimide (product made by Totoku Toryo Co., Ltd., product name "neo-heat 8600A") as a resin and had a thickness of 30 µm; the baked-coating resin layer (B) was formed using PAI as a resin and had a thickness of 30 µm; and the baked-coating resin layer (C) was formed using PI as a resin and had a thickness of 40 µm.

Example 11

An insulated wire was obtained in a manner similar to Example 5, except that: the baked-coating resin layer (A) was formed using a modified polyester as a resin and had a thickness of 30 µm; the baked-coating resin layer (B) was formed using PAI as a resin and had a thickness of 30 µm; the baked-coating resin layer (C) was formed using PI as a resin and had a thickness of 40 µm.

Case in which Extruded Covering Layer is Provided on Three Layers of Baked-Coating Resin Layer Example 12

Next, an example in which an extruded covering layer is provided on three baked-coating resin layers will be described. A rectangular conductor similar to the one used in Example 1 was prepared, and a PAI resin varnish was used as a thermosetting resin, and the resin was coated on the conductor using a die having a geometry similar to the shape of the conductor. The coated conductor was allowed to pass through a baking furnace set at 450° C. and having a furnace length of 8 m with a speed such that baking time is 15 seconds, to thus form an enamel layer of thickness 5 μm by this single baking step. By repeating this step for five times, a baked-coating resin layer (A) having a thickness of 25 μm was formed.

Then, on the baked-coating resin layer (A), using a PI resin varnish, a resin was coated on the baked-coating resin layer (A) using a die similar to the above, and, by repeating the baking step similar to the above for several times, a baked-coating resin layer (B) having a thickness of 25 μm was formed.

Then, on the baked-coating resin layer (B), using a modified polyester resin varnish (THEIC, trihydric or higher alcohol constituents 60 mol %), a resin was coated on the baked-coating resin layer (B) using a die similar to the above, and, by repeating the baking step similar to the above for several times, a baked-coating resin layer (C) having a thickness of 30 μm was formed, and an enamel layer composed of the baked-coating resin layers (A), (B), and (C) was obtained.

Using the obtained enamel wire as a core wire, a screw of the extruder used was 30 mm full flight, L/D=20, compression ratio 3. Then, as a thermoplastic resin, an extruded covering layer of thickness 40 μm was formed outside the enamel layer using PEEK (product made by Victrex Japan Inc., product name "PEEK381G"). In this manner, an insulated wire comprising a PEEK extruded covering enamel wire having a total thickness (total of the thickness of the enamel layer and the extruded covering resin layer) of 120 μm was obtained.

Example 13

An insulated wire was obtained in a manner similar to Example 12, except that: the baked-coating resin layer (A) was formed using a modified polyester (THEIC, trihydric or higher alcohol constituent 60 mol %) as a resin and had a thickness of 30 μm; the baked-coating resin layer (B) was formed using PAI as a resin and had a thickness of 30 μm; the baked-coating resin layer (C) was formed using PI as a resin and had a thickness of 20 μm; and the extruded covering layer had a thickness of 75 μm.

Example 14

An insulated wire was obtained in a manner similar to Example 12, except that: the baked-coating resin layer (A) was formed using polyesterimide as a resin and had a thickness of 30 μm; the baked-coating resin layer (B) was formed using PAI as a resin and had a thickness of 30 μm; the baked-coating resin layer (C) was formed using PI as a resin and had a thickness of 40 μm; and the extruded covering layer had a thickness of 60 μm.

Example 15

An insulated wire was obtained in a manner similar to Example 12, except that the extruded covering layer had a thickness of 120 μm.

Example 16

An insulated wire was obtained in a manner similar to Example 12, except that: the baked-coating resin layer (A) was formed using PI as a resin of and had a thickness of 30 μm; the baked-coating resin layer (B) was formed using a modified polyester (THEIC, trihydric or higher alcohol constituent 60 mol %) as a resin and had a thickness of 30 μm; the baked-coating resin layer (C) was formed using PI as a resin and had a thickness of 25 μm; and the extruded covering layer had a thickness of 150 μm.

Example 17

An insulated wire was obtained in a manner similar to Example 12, except that: the baked-coating resin layer (C) was formed using polyesterimide (product made by Totoku Toryo Co., Ltd., product name "neo-heat 8600A") as a resin and had a thickness of 25 μm, and the extruded covering layer had a thickness of 180 μm.

Example 18

An insulated wire was obtained in a manner similar to Example 12, except that: the baked-coating resin layer (A) was formed using a modified polyester (THEIC, trihydric or higher alcohol constituent 60 mol %) as a resin and had a thickness of 30 μm; the baked-coating resin layer (B) was formed using PAI as a resin and had a thickness of 30 μm; the baked-coating resin layer (C) was formed using PI as a resin and had a thickness of 20 μm; and the extruded covering layer had a thickness of 180 μm.

Example 19

An insulated wire was obtained in a manner similar to Example 12, except that the extruded covering layer had a thickness of 200 μm.

Example 20

An insulated wire was obtained in a manner similar to Example 15, except that the extruded covering layer was formed using a modified PEEK (manufactured by Solvay Specialty Polymers Japan Inc., product name "ABBA spire AV-650") as a resin and had a thickness of 45 μm.

Example 21

An insulated wire was obtained in a manner similar to Example 18, except that the extruded covering layer was formed using a modified PEEK as a resin and had a thickness of 120 μm.

Example 22

An insulated wire was obtained in a manner similar to Example 16, except that the extruded covering layer was formed using a modified PEEK as a resin and had a thickness of 200 μm.

Example 23

An insulated wire was obtained in a manner similar to Example 12, except that the extruded covering layer was formed using polyphenylene sulfide (manufactured by Polyplastics Co., Ltd., product name "FORTRAN 0220A9") as a resin and had a thickness of 45 µm.

Example 24

An insulated wire was obtained in a manner similar to Example 16, except that the extruded covering layer was formed using polyphenylene sulfide as a resin and had a thickness of 80 µm.

Example 25

An insulated wire was obtained in a manner similar to Example 18, except that the extruded covering layer was formed using polyphenylene sulfide as a resin and had a thickness of 115 µm.

Example 26

An insulated wire was obtained in a manner similar to Example 25, except that the extruded covering layer had a thickness of 180 µm.

Example 27

An insulated wire was obtained in a manner similar to Example 23, except that the extruded covering layer had a thickness of 195 µm.

Comparative Example 1

A rectangular conductor similar to the one used in Example 1 was prepared, and a baked-coating resin layer (A) having a thickness 15 µm was formed using a modified polyester (THEIC, trihydric or higher alcohol constituent 60 mol %), to obtain an insulated wire having a single enamel layer.

Comparative Example 2

An insulated wire was obtained in a manner similar to Example 1, except that the baked-coating resin layer (A) had a thickness of 15 µm and the baked-coating resin layer (B) had a thickness of 15 µm.

Comparative Example 3

An insulated wire was obtained in a manner similar to Example 1, except that the baked-coating resin layer (A) had a thickness of 15 µm and the baked-coating resin layer (B) had a thickness of 45 µm.

Comparative Example 4

An insulated wire having a single enamel layer was obtained in a manner similar to Comparative Example 1, except that the baked-coating resin layer (A) was formed using PAI as a resin and had a thickness of 60 µm.

Comparative Example 5

An insulated wire was obtained in a manner similar to Example 1, except that the baked-coating resin layer (A) was formed using polyamide-imide (manufactured by Hitachi Chemical Company Ltd., product name "HI-406") as a resin and the baked-coating resin layer (B) was formed using another polyamide-imide (manufactured by Hitachi Chemical Company Ltd., product name "HPC-9000") as a resin.

Comparative Example 6

Two enamel layers were formed was obtained in a manner similar to Comparative Example 2, except that the baked-coating resin layer (A) was formed using a modified polyester (THEIC, trihydric or higher alcohol constituent 60 mol %) as a resin and the baked-coating resin layer (B) was formed using PAI as a resin. Then, on this enamel layer, an extruded covering layer having a thickness of 100 µm was formed using PEEK, and an insulated wire comprising a PEEK extruded covering enamel wire having a total thickness (a sum of thicknesses of the enamel layer and the extruded coating resin layer) of 130 µm was obtained.

Comparative Example 7

A single enamel layer was obtained in a manner similar to Comparative Example 1, except that the baked-coating resin layer (A) had a thickness of 30 And, on this enamel layer, an extruded covering layer having a thickness of 120 µm was formed using PEEK and an insulated wire comprising a PEEK extruded covered enamel wire having a total thickness (a sum of thicknesses of the enamel layer and the extruded covered resin layer) of 150 µm was obtained.

Then, regarding Examples and Comparative Examples described above, presence or absence of a crack reaching the conductor, a partial discharge inception voltage and dielectric breakdown voltage after bending were measured and evaluated in the following manner.

(1) Crack Reaching the Conductor

The insulated wire was cut into a 300 mm straight piece, and a scratch having a depth of approximately 5 µm was made at a central portion of the wire in a direction perpendicular to the longitudinal direction of the wire using a special jig. Then, placing the scratch at a peak, it was bent through 180° about a 1.0 mm iron core. Thereafter, presence or absence of a crack occurring near the peak was visually observed.

(2) Partial Discharge Inception Voltage

A partial discharge testing machine "KPD2050" manufactured by Kikusui Electronics Corp. was used for measuring a partial discharge inception voltage of the insulated wire. A specimen was prepared using two insulated wires having a rectangular cross-section such that a surface constituting one of the long sides of the cross-section is adhered to a surface constituting one of the long sides of the cross-section of the other of the two insulated wires over a length of 150 mm without a gap. Electrodes were connected between these two electric conductors, and an alternating voltage of 50 Hz was applied at a temperature of 25° C. and the voltage was continuously increased. The voltage at an instant at which the partial discharge of 10 pC occurred was measured as a voltage peak (Vp). The partial discharge inception voltage of less than 800 Vp was evaluated as unacceptable, greater than or equal to 800 Vp and less than 1200 Vp was evaluated as a pass, and greater than or equal to 1200 Vp was evaluated as excellent.

(3) Dielectric Breakdown Voltage after Bending

The insulated wire was cut into a 300 mm straight piece, and a scratch having a depth of approximately 5 µm was made at a central portion of the wire in a direction perpendicular to the longitudinal direction of the wire using a special jig. Then, the insulated wire with a scratch was wound around an iron core having a diameter of 1.0 mm, and with the insulated wire being wound around the iron core, one end of the iron core was inserted into copper particles. The wound end was connected to electrodes, and power was supplied at a voltage increase rate of 500 V/sec. The dielectric breakdown voltage of less than or equal to 5 kV was evaluated as unacceptable and greater than 5 kV was evaluated as a pass.

Regarding Examples and Comparative Examples, results obtained by measurements and evaluations described above are shown in Tables 1-1 and 1-2 and Table 2, respectively.

TABLE 1-1

| | | | Example 1 | Example 2 | Example 3 | Example 4 | Example 5 | Example 6 | Example 7 |
|---|---|---|---|---|---|---|---|---|---|
| Baked-coating resin layer (A) | Resin | | PAI | PI | PAI | Modified PEst | PAI | PAI | PI |
| | <For Polyester> | Type | — | — | — | THEIC | — | — | — |
| | Trihydric or higher alcohol constituents | Content (mol %) | — | — | — | 60 | — | — | — |
| | Relative permittivity | | 4.2 | 3.3 | 4.2 | 3.4 | 4.2 | 4.2 | 3.3 |
| | Coating thickness (um) | | 20 | 25 | 30 | 35 | 20 | 25 | 30 |
| Baked-coating resin layer (B) | Resin | | Modified PEst | PAI | Modified PEst | PAI | Modified PEst | PI | Modified PEst |
| | <For Polyester> | Type | THEIC | — | THEIC | — | THEIC | — | THEIC |
| | Trihydric or higher alcohol constituents | Content (mol %) | 70 | — | 70 | — | 70 | — | 60 |
| | Relative permittivity | | 3.4 | 4.2 | 3.4 | 4.2 | 3.4 | 3.3 | 3.4 |
| | Coating thickness (um) | | 40 | 40 | 50 | 60 | 20 | 25 | 30 |
| Baked-coating resin layer (C) | Resin | | — | — | — | — | PAI | Modified PEst | PI |
| | <For Polyester> | Type | — | — | — | — | — | THEIC | — |
| | Trihydric or higher alcohol constituents | Content (mol %) | — | — | — | — | — | 60 | — |
| | Relative permittivity | | — | — | — | — | 4.2 | 3.4 | 3.3 |
| | Coating thickness (um) | | — | — | — | — | 20 | 30 | 25 |
| Extruded covering layer | Resin | | — | — | — | — | — | — | — |
| | Coating thickness (um) | | — | — | — | — | — | — | — |
| Total coating thickness (um) | | | 60 | 65 | 80 | 95 | 60 | 80 | 85 |
| Bending workability test (Observation of cracks reaching conductor) | | | No | No | No | No | No | No | No |
| Partial discharge inception voltage (Vp) | | | 820 | 850 | 920 | 1080 | 830 | 900 | 950 |
| Dielectric breakdown voltage after bending process (kV) | | | 5.8 | 6.3 | 7.5 | 8.1 | 6.1 | 6.1 | 7.3 |

| | | | Example 8 | Example 9 | Example 10 | Example 11 | Example 12 | Example 13 | Example 14 |
|---|---|---|---|---|---|---|---|---|---|
| Baked-coating resin layer (A) | Resin | | PAI | PAI | PEsI | Modified Pest | PAI | Modified Pest | PEsI |
| | <For Polyester> | Type | — | — | — | THEIC | — | THEIC | — |
| | Trihydric or higher alcohol constituents | Content (mol %) | — | — | — | 60 | — | 60 | — |
| | Relative permittivity | | 4.2 | 4.2 | 3.5 | 3.4 | 4.2 | 3.4 | 3.5 |
| | Coating thickness (um) | | 25 | 30 | 30 | 30 | 25 | 30 | 30 |
| Baked-coating resin layer (B) | Resin | | Modified PEst | Modified PEst | PAI | PAI | PI | PAI | PAI |
| | <For Polyester> | Type | GRY | HTO | — | — | — | — | — |
| | Trihydric or higher alcohol constituents | Content (mol %) | 70 | 60 | — | — | — | — | — |
| | Relative permittivity | | 3.4 | 3.4 | 4.2 | 4.2 | 3.3 | 4.2 | 4.2 |
| | Coating thickness (um) | | 30 | 30 | 30 | 30 | 25 | 30 | 30 |
| Baked-coating resin layer (C) | Resin | | PAI | I | PI | PI | Modified PEst | PI | PI |
| | <For Polyester> | Type | — | — | — | — | THEIC | — | — |
| | Trihydric or higher alcohol constituents | Content (mol %) | — | — | — | — | 60 | — | — |
| | Relative permittivity | | 4.2 | 3.3 | 3.3 | 3.3 | 3.4 | 3.3 | 3.3 |
| | Coating thickness (um) | | 35 | 40 | 40 | 40 | 30 | 20 | 40 |
| Extruded covering layer | Resin | | — | — | — | — | PEEK | PEEK | PEEK |
| | Coating thickness (um) | | — | — | — | — | 40 | 75 | 60 |
| Total coating thickness (um) | | | 90 | 100 | 100 | 100 | 120 | 155 | 160 |
| Bending workability test (Observation of cracks reaching conductor) | | | No | No | No | No | No | No | No |
| Partial discharge inception voltage (Vp) | | | 900 | 1140 | 1120 | 1140 | 1350 | 1720 | 1770 |
| Dielectric breakdown voltage after bending process (kV) | | | 6.5 | 7.2 | 7.2 | 7.5 | 9.3 | 8.2 | 7.2 |

TABLE 1-2

|  |  |  | Example 15 | Example 16 | Example 17 | Example 18 | Example 19 | Example 20 | Example 21 |
|---|---|---|---|---|---|---|---|---|---|
| Baked-coating resin layer (A) | Resin |  | PAI | PI | PAI | Modified PEst | PAI | PAI | Modified Pest |
|  | <For Polyester> | Type | — | — | — | THEIC | — | — | THEIC |
|  | Trihydric or higher alcohol constituents | Content (mol %) | — | — | — | 60 | — | — | 60 |
|  | Relative permittivity |  | 4.2 | 3.3 | 4.2 | 3.4 | 4.2 | 4.2 | 3.4 |
|  | Coating thickness (um) |  | 25 | 30 | 25 | 30 | 25 | 25 | 30 |
| Baked-coating resin layer (B) | Resin |  | PI | Modified PEst | PI | PAI | PI | PI | PAI |
|  | <For Polyester> | Type | — | THEIC | — | — | — | — | — |
|  | Trihydric or higher alcohol constituents | Content (mol %) | — | 60 | — | — | — | — | — |
|  | Relative permittivity |  | 3.3 | 3.4 | 3.3 | 4.2 | 3.3 | 3.3 | 4.2 |
|  | Coating thickness (um) |  | 25 | 30 | 25 | 30 | 25 | 25 | 30 |
| Baked-coating resin layer (C) | Resin |  | Modified PEst | PI | PEsl | PI | Modified PEst | Modified PEst | PI |
|  | <For Polyester> | Type | THEIC | — | — | — | THEIC | THEIC | — |
|  | Trihydric or higher alcohol constituents | Content (mol %) | 60 | — | — | — | 60 | 60 | — |
|  | Relative permittivity |  | 3.4 | 3.3 | 3.5 | 3.3 | 3.4 | 3.4 | 3.3 |
|  | Coating thickness (um) |  | 30 | 25 | 25 | 20 | 30 | 30 | 20 |
| Extruded covering layer | Resin |  | PEEK | PEEK | PEEK | PEEK | PEEK | Modified PEEK | Modified PEEK |
|  | Coating thickness (um) |  | 120 | 150 | 180 | 4180 | 200 | 45 | 120 |
| Total coating thickness (um) |  |  | 200 | 235 | 255 | 260 | 280 | 125 | 200 |
| Bending workability test (Observation of cracks reaching conductor) |  |  | No | No | No | No | No | No | No |
| Partial discharge inception voltage (Vp) |  |  | 2200 | 2550 | 2780 | 2820 | 3050 | 1380 | 2180 |
| Dielectric breakdown voltage after bending process (kV) |  |  | 9.5 | 7.8 | 6.2 | 7.3 | 8.2 | 8.8 | 9.1 |

|  |  |  | Example 22 | Example 23 | Example 24 | Example 25 | Example 26 | Example 27 |
|---|---|---|---|---|---|---|---|---|
| Baked-coating resin layer (A) | Resin |  | PI | PAI | PI | Modified PEst | Modified PEst | PAI |
|  | <For Polyester> | Type | — | — | — | THEIC | THEIC | — |
|  | Trihydric or higher alcohol constituents | Content (mol %) | — | — | — | 60 | 60 | — |
|  | Relative permittivity |  | 3.3 | 4.2 | 3.3 | 3.4 | 3.4 | 4.2 |
|  | Coating thickness (um) |  | 30 | 25 | 30 | 30 | 30 | 25 |
| Baked-coating resin layer (B) | Resin |  | Modified PEst | PI | Modified PEst | PAI | PAI | PI |
|  | <For Polyester> | Type | THEIC | — | THEIC | — | — | — |
|  | Trihydric or higher alcohol constituents | Content (mol %) | 60 | — | 60 | — | — | — |
|  | Relative permittivity |  | 3.4 | 3.3 | 3.4 | 4.2 | 4.2 | 3.3 |
|  | Coating thickness (um) |  | 30 | 25 | 30 | 30 | 30 | 25 |
| Baked-coating resin layer (C) | Resin |  | PI | Modified PEst | PI | PI | PI | Modified PEst |
|  | <For Polyester> | Type | — | THEIC | — | — | — | THEIC |
|  | Trihydric or higher alcohol constituents | Content (mol %) | — | 60 | — | — | — | 60 |
|  | Relative permittivity |  | 3.3 | 3.4 | 3.3 | 3.3 | 3.3 | 3.4 |
|  | Coating thickness (um) |  | 25 | 30 | 25 | 20 | 20 | 30 |
| Extruded covering layer | Resin |  | Modified PEEK | PPS | PPS | PPS | PPS | PPS |
|  | Coating thickness (um) |  | 200 | 45 | 80 | 115 | 180 | 195 |
| Total coating thickness (um) |  |  | 285 | 125 | 165 | 195 | 260 | 275 |
| Bending workability test (Observation of cracks reaching conductor) |  |  | No | No | No | No | No | No |
| Partial discharge inception voltage (Vp) |  |  | 3100 | 1400 | 1800 | 2150 | 2840 | 2950 |
| Dielectric breakdown voltage after bending process (kV) |  |  | 9.5 | 8.5 | 7.3 | 7.5 | 7.3 | 8.1 |

TABLE 2

| | | | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|
| Baked-coating resin layer (A) | Resin | | Modified PEst | PAI | PAI | PAI | PAI | Modified PEst | Modified PEst |
| | <For Polyester> | Type | THEIC | — | — | — | — | THEIC | THEIC |
| | Trihydric or higher alcohol constituents | Content (mol %) | 60 | — | — | — | — | 60 | 60 |
| | Relative permittivity | | 3.4 | 4.2 | 4.2 | 4.2 | 4.2 | 3.4 | 3.4 |
| | Coating thickness (μm) | | 15 | 15 | 15 | 60 | 20 | 15 | 30 |
| Baked-coating resin layer (B) | Resin | | — | Modified PEst | Modified PEst | — | PAI(2) | PAI | — |
| | <For Polyester> | Type | — | THEIC | THEIC | — | — | — | — |
| | Trihydric or higher alcohol constituents | Content (mol %) | — | 70 | 70 | — | — | — | — |
| | Relative permittivity | | — | 3.4 | 3.4 | — | 4.3 | 4.2 | — |
| | Coating thickness (μm) | | — | 15 | 45 | — | 40 | 15 | — |
| Baked-coating resin layer (C) | Resin | | — | — | — | — | — | — | — |
| | <For Polyester> | Type | — | — | — | — | — | — | — |
| | Trihydric or higher alcohol constituents | Content (mol %) | — | — | — | — | — | — | — |
| | Relative permittivity | | — | — | — | — | — | — | — |
| | Coating thickness (μm) | | — | — | — | — | — | — | — |
| Extruded covering layer | Resin | | — | — | — | — | — | PEEK | PEEK |
| | Coating thickness (μm) | | — | — | — | — | — | 100 | 120 |
| Total coating thickness (μm) | | | 15 | 30 | 60 | 60 | 60 | 130 | 150 |
| Bending workability test (Observation of cracks reaching conductor) | | | _Yes_ | No | No | _Yes_ | _Yes_ | No | _Yes_ |
| Partial discharge inception voltage (Vp) | | | _230_ | _400_ | 830 | _750_ | _740_ | 1400 | 1680 |
| Dielectric breakdown voltage after bending process (kV) | | | _0.5_ | 3.9 | _4.1_ | _0.5_ | _0.4_ | _3.2_ | _0.6_ |

N.B. NUMERICAL VALUES IN BOLD ITALIC IN THE TABLE ARE OUT OF APPROPRIATE RANGE OF THE EXAMPLE

Referring to the results shown in Tables 1-1 and 1-2, it was found that, for a case in which two layers of baked-coating resin layer were provided (Examples 1 to 4), when the first layer (inner layer) was formed using one of PAI, PI, and a modified polyester as a resin and had a thickness of 20 μm to 35 μm, the second layer (outer layer) was formed using a modified polyester or PAI as a resin and had a thickness of 40 μm to 60 μm, a total thickness of the two layers of baked-coating resin layers was 60 μm to 95 μm, and a relative permittivity of the lower layer of the two layers was 3.3 to 3.5, a crack from the baked-coating resin layer and reaching the conductor did not occur, and also, the partial discharge inception voltage and the dielectric breakdown voltage after the bending were both high.

Also, it was found that, for a case in which three layers of baked-coating resin layers were provided (Examples 5 to 11), when the first layer (inner layer) was formed using one of PAI, PI, polyesterimide, and a modified polyester as a resin and had thickness of 20 μm to 30 μm, the second layer (intermediate layer) was formed using one of a modified polyester, PI and PAI, as a resin and had a thickness of 20 μm to 30 μm, the third layer (outer layer) was formed using one of PAI, a modified polyester, PI and PAI as a resin and had a thickness of 20 μm to 40 μm, a total thickness of the three layers of baked-coating resin layers was 60 μm to 100 μm, and a relative permittivity of the lowest of the three layers was 3.3 to 3.5, a crack from the baked-coating resin layer and reaching the conductor did not occur, and also, the partial discharge inception voltage and the dielectric breakdown voltage after the bending were both high.

Further, for a case in which an extruded covering layer was provided on three layers of baked-coating resin layers (Examples 12 to 27), when the first layer (inner layer) was formed using one of PAI, a modified polyester, polyesterimide, PAI, and PI as a resin and had a thickness of 25 μm to 30 μm, the second layer (intermediate layer) was formed using one of PI, PAI, and a modified polyester as a resin and had a thickness of 25 μm to 30 μm, the third layer (outer layer) was formed using one of a modified polyester, PI and, polyesterimide as a resin and had a thickness of 20 μm to 40 μm, a relative permittivity of the lowest of the three layers was 3.3 to 3.5 and a total thickness of the three layers of baked-coating resin layers was 120 μm to 285 μm, a crack from the baked-coating resin layer and reaching the conductor did not occur, the dielectric breakdown voltage after the bending was high, and further, the partial discharge inception voltage was very high.

On the other hand, referring to the results of Table 2, in Comparative Example 1, the single-layered baked-coating resin layer was formed using a modified polyester as a resin and had a thickness of 15 μm, and, a crack from the extruded covering layer and reaching the conductor occurred in the bend process. Also, the partial discharge inception voltage and the dielectric breakdown voltage after the bending both became out of a range of the present disclosure and had poor insulating properties.

In Comparative Example 2, among the two layers of baked-coating resin layers, the inner layer was formed using PAI as a resin and had a thickness of 15 μm, the outer layer was formed using a modified polyester as a resin and had a thickness of 15 μm, and a total thickness of the two layers of baked-coating resin layers was 30 μm, the partial discharge inception voltage and the dielectric breakdown voltage after the bending both became out of a range of the present disclosure and had poor insulating properties.

In Comparative Example 3, among the two layers of baked-coating resin layers, the inner layer was formed using PAI as a resin and had a thickness of 15 μm, outer layers was formed using a modified polyester as a resin and had a thickness of 45 μm, and a total thickness of the two layers of baked-coating resin layers were 60 μm, the dielectric breakdown voltage after the bending both became out of a range of the present disclosure and had poor insulating properties.

In Comparative Example 4, the single-layered baked-coating resin layer was formed using PAI as a resin and had a thickness of 60 µm, and, a crack from the extruded covering layer and reaching the conductor occurred. Also, because of high permittivity, the partial discharge inception voltage was out of range of the present disclosure, and further, the dielectric breakdown voltage after the bending was also out of range of the present disclosure and had poor insulating properties.

In Comparative Example 5, among the two layers of baked-coating resin layers, the inner layer was formed using PAI and had a thickness of 20 µm, the outer layer was formed using another PAI (PAI (2)) and had thickness of 40 µm, a total thickness of the two layers of baked-coating resin layers was 60 µm, and a crack from an extruded covering layer and reaching the conductor occurred. Also, because of high permittivity, the partial discharge inception voltage was out of range of the present disclosure, and further, the dielectric breakdown voltage after the bending was also out of range of the present disclosure and had poor insulating properties.

In Comparative Example 6, among the two layers of baked-coating resin layers, the inner layer was formed using a modified polyester as a resin and had a thickness of 15 µm, the outer layer was formed using PAI as a resin and had a thickness of 15 µm, a total thickness of the two layers of baked-coating resin layers and the PEEK extruded covering layer was 130 µm, and although a crack reaching the conductor can be prevented, since the adherence between the enamel layer and the extruded covering layer is excessively high, a crack reached the PAI layer during the bending. Also, the dielectric breakdown voltage after the bending was out of range of the present disclosure, and had poor insulating properties.

In Comparative Example 7, the single-layered baked-coating resin layer was formed using a modified polyester as a resin and had a thickness of 30 µm, and the total thickness of the single-layered baked-coating resin layer and the PEEK extruded covering layer was 150 µm, and since adhesion with the extruded covering layer is excessively high, a crack that reaches from the extruded covering layer to the conductor in the bend process occurred. Further, the dielectric breakdown voltage after the bending became out of a range of the present disclosure and was poor in the insulating properties.

The rectangular insulated wire of the present disclosure is preferably used as a magnet wire for motor coils installed in EVs (electromobile) or HVs (hybrid vehicle).

What is claimed is:

1. A rectangular insulated wire comprising:
    a rectangular conductor having a generally rectangular cross section; and
    a plurality of baked-coating resin layers disposed to cover the rectangular conductor,
    each of the plurality of baked-coating resin layers being formed of at least one resin selected from a group comprising a polyester-based resin including a trihydric or tetrahydric alcohol constituent, a polyester imide resin, a polyamide-imide resin and a polyimide resin,
    an adhesion strength between the plurality of baked-coating resin layers being greater than or equal to 5 g/mm and less than or equal to 10 g/mm,
    each of the plurality of baked-coating resin layers having a thickness of greater than or equal to 20 µm and less than or equal to 60 µm.

2. The rectangular insulated wire according to claim 1, wherein each of the plurality of baked-coating resin layers is formed of a single resin selected from a group comprising a polyester-based resin including a trihydric or tetrahydric alcohol constituent, a polyester imide resin, a polyamide-imide resin and a polyimide resin.

3. The rectangular insulated wire according to claim 1, wherein a content of the trihydric or tetrahydric alcohol constituent is 30 to 90 mol % with respect to a total number of moles of alcohol constituents in the polyester-based resin.

4. The rectangular insulated wire according to claim 1, wherein the trihydric or tetrahydric alcohol constituent is a component derived from at least one selected from a group comprising trihydroxy ethylisocyanate, glycerin and trimethylolpropane.

5. The rectangular insulated wire according to claim 1, wherein the plurality of baked-coating resin layer has a total thickness of greater than or equal to 60 µm and less than or equal to 100 µm.

6. The rectangular insulated wire according to claim 1, further comprising an extruded covering layer disposed over an outermost layer of the plurality of baked-coating resin layer, the extruded covering layer being formed of a thermoplastic resin.

7. The rectangular insulated wire according to claim 1, wherein the rectangular insulated wire has a partial discharge inception voltage of greater than or equal to 800 Vp and less than or equal to 1500 Vp.

8. The rectangular insulated wire according to claim 6, wherein the thermoplastic resin is a crystalline resin having a melting point of greater than or equal to 250° C. and less than or equal to 360° C.

9. The rectangular insulated wire according to claim 6, wherein the thermoplastic resin is a resin selected from a group comprising polyetheretherketone and modified polyetheretherketone.

10. The rectangular insulated wire according to claim 6, wherein the thermoplastic resin is polyphenylene sulfide.

11. The rectangular insulated wire according to claim 1, wherein the rectangular conductor is composed of one of aluminum, an aluminum alloy, copper and a copper alloy.

12. A coil wherein the rectangular insulated wire according to claim 1 is wound.

13. An electric or electronic device comprising the coil as claimed in claim 12.

* * * * *

UNITED STATES PATENT AND TRADEMARK OFFICE
CERTIFICATE OF CORRECTION

PATENT NO. : 10,109,389 B2  
APPLICATION NO. : 15/246665  
DATED : October 23, 2018  
INVENTOR(S) : Fukuda et al.

Page 1 of 1

It is certified that error appears in the above-identified patent and that said Letters Patent is hereby corrected as shown below:

In the Specification

Column 21, TABLE 1-2, Example 18 Coating thickness (um) "4180" should read -- 180 -- as shown below.

TABLE 1-2

|  |  |  | Example 15 | Example 16 | Example 17 | Example 18 | Example 19 | Example 20 | Example 21 |
|---|---|---|---|---|---|---|---|---|---|
| Baked-coating resin layer (A) | Resin |  | PAI | PI | PAI | Modified PEst | PAI | PAI | Modified PEst |
|  | <For Polyester> | Type | — | — | — | THEIC | — | — | THEIC |
|  | Trihydric or higher alcohol constituents | Content (mol %) | — | — | — | 60 | — | — | 60 |
|  | Relative permittivity |  | 4.2 | 3.3 | 4.2 | 3.4 | 4.2 | 4.2 | 3.4 |
|  | Coating thickness (um) |  | 25 | 30 | 25 | 30 | 25 | 25 | 30 |
| Baked-coating resin layer (B) | Resin |  | PI | Modified PEst | PI | PAI | PI | PI | PAI |
|  | <For Polyester> | Type | — | THEIC | — | — | — | — | — |
|  | Trihydric or higher alcohol constituents | Content (mol %) | — | 60 | — | — | — | — | — |
|  | Relative permittivity |  | 3.3 | 3.4 | 3.3 | 4.2 | 3.3 | 3.3 | 4.2 |
|  | Coating thickness (um) |  | 25 | 30 | 25 | 30 | 25 | 25 | 30 |
| Baked-coating resin layer (C) | Resin |  | Modified PEst | PI | PEst | PI | Modified PEst | Modified PEst | PI |
|  | <For Polyester> | Type | THEIC | — | — | — | THEIC | THEIC | — |
|  | Trihydric or higher alcohol constituents | Content (mol %) | 60 | — | — | — | 60 | 60 | — |
|  | Relative permittivity |  | 3.4 | 3.3 | 3.5 | 3.3 | 3.4 | 3.4 | 3.3 |
|  | Coating thickness (um) |  | 30 | 25 | 25 | 20 | 30 | 30 | 20 |
| Extruded covering layer | Resin |  | PEEK | PEEK | PEEK | PEEK | PEEK | Modified PEEK | Modified PEEK |
|  | Coating thickness (um) |  | 120 | 150 | 180 | 180 | 200 | 45 | 120 |
| Total coating thickness (um) |  |  | 200 | 235 | 255 | 260 | 280 | 125 | 200 |
| Bending workability test (Observation of cracks reaching conductor) |  |  | No | No | No | No | No | No | No |
| Partial discharge inception voltage (Vp) |  |  | 2200 | 2550 | 2780 | 2820 | 3050 | 1380 | 2180 |
| Dielectric breakdown voltage after bending process (kV) |  |  | 9.5 | 7.8 | 6.2 | 7.3 | 8.2 | 8.8 | 9.1 |

Signed and Sealed this  
Twelfth Day of November, 2019

Andrei Iancu  
*Director of the United States Patent and Trademark Office*